United States Patent Office 3,523,143
Patented Aug. 4, 1970

---

3,523,143
CURING OF EPOXY RESINS WITH AN ACID TERMINATED POLYESTER AND A POLYCARBOXYLIC ACID ANHYDRIDE
Joseph N. S. Kwong, St. Paul, Minn., assignor to Minnesota Mining and Manufacturing Company, St. Paul, Minn., a corporation of Delaware
No Drawing. Continuation-in-part of application Ser. No. 553,695, Dec. 19, 1955. This application Sept. 10, 1959, Ser. No. 839,069
Int. Cl. C08g 45/14
U.S. Cl. 260—835
8 Claims

ABSTRACT OF THE DISCLOSURE

Epoxy resins may be cured with acid-terminated polyesters, preferably a diester of polyalkylene glycol and polycarboxylic acid anhydride. An additional amount of polycaroboxylic acid anhydride is added to form a three component composition. In an example 100 parts polyethylene glycol (M. Wt.=200) were reacted with 98 parts maleic anhydride to form an acid-terminated diester. 20 grams of the diester were reacted with 40 grams polyglycidyl ether of bisphenol A and 26.8 grams tetrapropenyl succinic anhydride, with 0.2 gram dimethylbenzyl amine catalyst.

---

This application as a continuation-in-part of copending application Ser. No. 553,695 filed Dec. 19, 1955, now abandoned.

This invention relates to internal plasticizers for epoxy resins, to methods of making and using the same, and to the cured resinous products obtained thereby. More specifically, the invention is concerned with thermosetting epoxy resin compositions which have low viscosity and long pot life and cure rapidly at moderately elevated temperatures to strong, tough resinous products characterized by their improved resistance to breakage under thermal and mechanical shock. The novel thermosetting compositions are prepared from relatively low priced and readily available materials by simple and economical processes.

Typical epoxy resins are those which are obtained from epichlorhydrin and bisphenol or equivalent reactants and which have been represented by the following general formula:

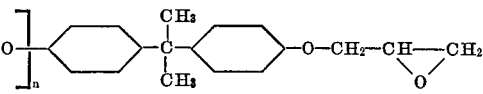

where $n$ has an average value between zero and about seven. Somewhat analogous epoxy resins may be prepared from epichlorhydrin and glycerol. Other polyhydric phenols such as resorcinol may be substituted for the bisphenol to provide various polyglycidyl ethers of polyhydric phenol or polyhydric alcohol. In all cases, the epoxy resin contains an average of more than one epoxy group,

also called the oxirane group, per average molecular weight.

Epoxy resins may be cured by reaction with organic acid anhydrides, various alkaline materials etc., to form infusible, insoluble resinous products of great strength, high heat distortion, excellent adhesion to a variety of surfaces and good resistance to solvents. However, the cured products have a tendency toward brittleness, particularly at low temperatures, and this shortcoming has impeded the application of epoxy resins to uses for which they were otherwise singularly suited. For example, the electronics industry makes widespread use of resins for potting purposes, but most thermosetting epoxy resin compositions cannot be used to pot steel or other metal articles and withstand the strains introduced on cooling the casting from reaction temperature to room temperature or below.

It is well known that a variety of materials can be incorporated into thermosetting epoxy resin compositions to plasticize the cured products thereof, that is, to render the cured products less brittle and less transmissive of mechanical shock, e.g., by imparting flexibility and elasticity thereto. Every plasticizer heretofore known, however, involves certain disadvantages which restrict the number of applications for which it may be used. Most plasticizers involve an undesirable increase in viscosity in the uncured compositions, making them unsuitable or less suitable for use in encapsulating complex articles or as impregnants for fibrous materials. In some cases, a satisfactorily low viscosity may be obtained by increasing the temperature of an uncured composition, but this reduces the pot life or period of time for which the composition is suitable for its intended uses. Some plasticizers increase to an undesirable extent the time required to cure the epoxy resin composition. Other plasticizers result in considerable sacrifice in quality in the cured products, e.g., in less of resistance to moisture or in reduction in tensile strength.

It is now found that epoxy resin compositions can be provided which have low viscosity, long pot life, and cure rapidly at moderately elevated temperatures to strong, tough, heat-resistant products having improved resistance to breakage at low temperatures and under thermal and mechanical shock. This combination of useful properties is obtained by a novel composition which comprises a mixture of epoxy resin having more than one 1,2-epoxy group per average molecular weight, polycarboxylic acid or anhydride thereof, and polyalkylene glycol of the formula

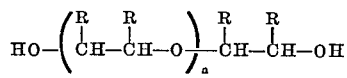

wherein $n$ is an integer averaging at least about 3, each R is hydrogen or alkyl, and any two R's attached to adjoining carbon atoms together contain a total of not more than 4 carbon atoms. Since the attainment of low viscosity is of utmost importance, the viscosity of the polyalkylene glycol should not exceed about 20,000 centipoises at 25° C.

Preferably, the polyalkylene glycol is prereacted with a portion of either the epoxy resin or the polycarboxylic acid, which portion contains at least about 1.1 carboxyl or 1,2-epoxy groups (whichever is the case) per hydroxyl group of polyalkylene glycol, to form an acid-terminated or epoxy-terminated polyether. Preference for the prereaction is particularly strong where a large proportion of the R groups is alkyl, e.g., polypropyleneglycol, because such polyglycols react rather slowly with polycarboxylic acids or their anhydrides; and the hazard exists that the polycarboxylic acid or anhydride might cure the resin without the polyglycol, or substantial portions thereof, becoming incorporated into the cured product, which incorporation is believed to be necessary to obtain maximum strength and resistance to degradation. In any event, the use of polypropylene glycol rather than a preformed acid-terminated (carboxyl-terminated) polyester thereof is found to slow the curing operation.

The viscosity of the polyalkylene glycol or preformed reaction product thereof should not exceed about 20,000 centipoises at 25° C. to attain desirably low viscosity in the novel thermosetting compositions. In all cases, the mixture apart from extraneous additives such as inert fillers, whether or not it includes either or both acid-terminated or epoxy-terminated polyether, should not have a bulk viscosity in excess of 20,000 centipoises at 25° C. Since moderate heating substantially reduces the viscosity, usually without causing gelation for at least 20 minutes, warmed compositions of such room-temperature viscosity readily penetrate minute interstices such as are present in fine electrical coils.

For the novel composition to cure upon heating to a tough, strong, shock-resistant state, it must include at least 1.5 carboxyl groups per hydroxyl group of polyalkylene glycol. In other words, at least 3.0 carboxyl groups of polycarboxylic acid must be present for each

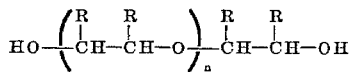

At least 0.4 of the 1.5 carboxyl groups per hydroxyl group must be anhydride-forming polycarboxylic acid, preferably the anhydride itself. When a portion of the polycarboxylic acid has been prereacted with the polyalkylene glycol, the composition must contain another portion of unreacted cyclic polycarboxylic anhydride including at least 0.4 carboxyl groups (or 0.2 anhydride groups) per hydroxyl group originally present in the polyalkylene glycol or per carboxyl group of the resultant carboxyl-terminated polyester. The composition should include at least 0.2 epoxy group of epoxy resin per carboxyl group of said polyester, and there should be a total of at least about ¾ carboxyl group of said polyester plus anhydride group of anhydride per epoxy group of epoxy resin. Preferably about 2 to 5 anhydride groups are present per unreacted carboxyl group of the carboxyl-terminated polyester.

When a portion of the epoxy resin has been pre-reacted with the polyalkylene glycol, the composition must contain another portion of unreacted epoxy resin including at least 0.2 epoxy groups per hydroxyl group originally present in the polyalkylene glycol.

While the simple mixture of epoxy resin, polycarboxylic acid and polyalkylene glycol or preformed polyester thereof may cure with moderate heating to a strong thermoset state, it is usually necessary to add catalytic quantities of an activator such as tertiary amine or organo metallic salt if the cure is to be complete within a reasonably short period of time, e.g., 2 hours. 120° C. is usually required. Where epoxy-terminated polyether has been preformed, interaction with additional epoxy resin to a strong thermoset state may be carried out in the absence of polycarboxylic acid by means of an activator such as tertiary amine, boron trifluoride or an amine complex thereof, which catalyzes the reaction of one epoxy group with another, although the activator may necessarily be present in larger proportion than may be considered "catalytic." Even so, the addition of polycarboxylic acid particularly in anhydride form, materially assists in the attainment of a strong tough cured product.

About 5–40% of the total weight of the mixture, exclusive of extraneous additives, should be contained in the alkylene ether or

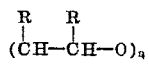

portion of the polyalkylene glycol. If the proportion exceeds about 40%, the cured product is undesirably weak for most intended purposes such as for potting electrical components. Since electrical casting resins are preferably semirigid, while having just enough flexibility for good resistance to thermal and mechanical shock, it is usually preferred that the proportion be less than 20%. Below 10% alkylene ether, the cured products lack flexibility and may have an elongation at break of less than about 40%, determined as described hereinbelow, unless some other long-chain component is chemically combined into the structure. Even with other long-chain components, the proportion of polyalkylene ether should not be much less than 5% or the uncured composition lacks the feature of low viscosity by which this invention is particularly characterized.

The preferred mode of practicing the invention employs the acid-terminated polyester prepared by esterifying two moles of a dicarboxylic acid or the anhydride thereof with one mole of a long-chain polyalkylene glycol, whereby a polymer is formed having a straight skeletal chain comprised of a plurality of alkylene ether groups and terminated at each end by a single carboxylic acid group which is connected to the polyalkylene ether chain predominantly through a single ester linkage. In order to attain the desired combination of low viscosity in the uncured compositions with well plasticized cured products thereof, the acid-terminated polyester should contain an average of at least about three alkylene ether groups and preferably at least about six or eight alkylene ether groups per average molecular weight. Such an acid-terminated polyester is believed to be novel and patentable per se.

As little as 1.1 moles of a dicarboxylic acid per mole of polyalkylene glycol may usually be employed in making the acid-terminated polyester without undesirably high increase in viscosity. Such acid-terminated polyester contains about 15

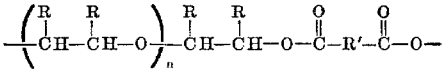

groups per average molecular weight. However, it is usually preferred to keep the ratio of moles of dicarboxylic acid to glycol at 3:2 or above, and the higher the ratio is, up to 2:1, the easier the reaction between the acid and glycol is to control and the better the uniformity of product. When the polycarboxylic acid has more than two carboxyl groups in the molecule, the ratio of carboxyl groups to hydroxyl groups is governing.

Likewise, when employing the epoxy-terminated polyether, it is preferred to use close to four epoxide equivalents of epoxy resin per mole of polyalkylene glycol, particularly when employing little or no polycarboxylic acid in curing. In fact, it may be difficult to cure an epoxy-terminated polyether of less than about 1.3 epoxide equivalents of resin per hydroxide equivalent of polyalkylene glycol without the use of polycarboxylic acid.

It will be appreciated by those skilled in the art that polymeric chains may be formed which contain small proportions of groups other than alkylene ether groups, e.g., the residue of bisphenol, linked with major proportions of alkylene ether groups. Since such polymeric chains behave essentially as polyalkylene ether chains, they are considered equivalent thereto and reference herein to polyalkylene ethers is meant to include such materials as long as they contain at least about three consecutive alkylene ether groups per average molecular weight.

It should also be noted that the terminal carboxylic acid ester groups of the acid-terminated polyesters may be replaced by a number of other functional groups readily reactive with epoxy resin. Among such functional end groups are amino, isocyanato, mercapto, and hydrazido groups.

In reacting a carboxylic acid with oxirane oxygen, it is considered that one epoxide equivalent of resin is stoichiometrically equivalent to one equivalent of acid, in that a reaction can proceed in such proportion without evolution of water. However, the reaction creates a free hydroxyl group which can react under certain conditions with another acid group to split off water. On the other hand, one mole of a dicarboxylic acid anhydride can react with one epoxide equivalent of resin without evolution of water so that such proportion is said to be stoichiometrically equivalent. Accordingly, when a carboxylic acid anhydride and a polyalkylene ether diacid ester are used to cure an epoxy resin, the proportions may be chosen so that one epoxy group is present for each anhydride group and for each carboxyl group which is not part of an anhydride group. However, an excess of carboxyl groups may be used with a basic catalyst without evolution of water, and as much as 20 to 30% deviation from stoichiometry in either direction may be tolerated without much difference in quality of cured product.

While the ability to cure to an infusible, insoluble state without the evolution of volatiles constitutes one of the features of the novel thermosetting compositions, the addition of volatile liquid diluents to form either organic solutions or aqueous dispersions is not precluded and has been found to be advantageous in certain applications, as in making thin coatings.

Because the viscosity of the thermosetting composition is ordinarily made as low as possible the polycarboxylic acid or its anhydride is accordingly selected for its low viscosity. Particularly suitable in this respect are the reaction products of equimolar proportions of maleic anhydride and olefins, which products may be termed alkenyl succinic anhydrides. These anhydrides are liquids at normal room temperatures, and when blended with low molecular weight epoxy resins produce thermosetting compositions of low viscosity. One which has proved to be of considerable value in the practice of this invention is tetrapropenyl succinic anhydride, which is prepared by heating together equimolar proportions of maleic anhydride and the tetramer of propylene.

Other suitable polycarboxylic acids include aromatic, aliphatic and cycloaliphatic acids and may contain ethylenic unsaturation. However, if the aromatic or cycloaliphatic proportion is too large, the viscosity of the composition might be somewhat high and the cured product might be less flexible than desired.

The low viscosities of the compositions of this invention allow large percentages of finely divided inert matter to be incorporated therein without unduly restricting the ability of the composition to saturate complex articles. Inert matter such as carbon black, zinc sulfide, micalith, asbestos fiber, powdered inert resins, and powdered metals may be included to lend particular electrical properties, to effect a cost reduction, to lower the coefficient of expansion, to ease thermal strains, to provide a desired coloring, or for a variety of other reasons.

The following typical examples will serve more fully to describe the invention and should not be considered as limitative in any respect.

EXAMPLE I

Two moles of maleic anhydride were mixed with one-half mole of polyethylene glycol of 400 average molecular weight, and 0.05 percent by weight of pyrogallol was added to the mixture. Under a nitrogen blanket, the temperature of the mixture was gradually raised to 65° C. over a period of 15 minutes with stirring, during which time the maleic anhydride completely melted. Another one-half mole of the polyethylene glycol was then added, and the temperature of the mixture was raised to 110° C. over a period of fifty minutes, then heated to and held at about 120° C. for 1½ hours. After cooling to room temperature, the nitrogen blanket was removed, and the viscosity of the product was measured on a Brookfield viscometer and found to be 3150 centipoises at 25° C.

The reaction product was analyzed and found to be an acid-terminated diester essentially corresponding to the formula $$HOOCCH=CH-\overset{O}{\underset{\|}{C}}-O-(CH_2-CH_2O)_n-CH_2CH_2-O-\overset{O}{\underset{\|}{C}}-CH=CHCOOH$$

where $n$ is an integer having the value in this case of about 8.

Thirty grams of this acid-terminated diester were mixed with 40 grams of epoxy resin, and 27 grams of a mixture of 99.25 percent tetrapropenyl succinic anhydride and 0.75 percent dimethylbenzyl amine were added with heating. The epoxy resin was the reaction product of about 10 moles of epichlorhydrin per mole of bisphenol A, and it had a melting point of about 10° C. as determined by the Durrans' Mercury Method and an epoxide equivalent weight of about 200. The ingredients of the composition were present in stoichiometrically equivalent amounts, based on one epoxy group of resin for each carboxyl group of the acid-terminated diester and for each anhydride group of the tetrapropenyl succinic anhydride. The ethylene ether $$(CH_2-CH_2-O)_8$$

content of the composition was about 17.5% by weight.

An ordinary steel hexagonal nut of about one-half inch diameter was placed at the center of a two-inch aluminum dish, and the above composition was poured into the dish to cover the nut with about a ⅛ inch layer. After one hour in an oven at 120° C., the resin gelled, and after a second hour, it had cured to a strong, tough resinous product which was hard and rigid at room temperature. Upon gradual cooling to −64° C., the resinous casting did not crack and remained tightly adhered to the nut at all places. When placed in a Dry Ice-acetone bath, hairline fissures developed in the cured resin.

This so-called "nut test" gives a rough measure of the flexibility and elasticity of a cured resin in that epoxy resin compositions have a coefficient of thermal volume expansion on the order of ten times that of steel. Only well-plasticized resin compositions cast on a steel nut can withstand large temperature changes without cracking. In contrast, castings around identical steel nuts using mixtures of the same epoxy resin with either or both of the maleic and tetrapropenyl succinic anhydrides but without the acid-terminated diester invariably crack on cooling to room temperature.

EXAMPLE II

A thermosetting composition was prepared using the same ingredients in the same proportions as in the preceding example except that the polyethylene glycol and maleic anhydride were not prereacted. That is, 40 grams of the epoxy resin, 20 grams of polyethylene glycol of 400 average molecular weight, 10 grams of maleic anhydride, and 27 grams of the tetrapropenyl succinic anhydride- dimethylbenzyl amine mixture were mixed together with sufficient heating to melt the maleic anhydride and poured around a steel hex nut as in the preceding example. The composition gelled in 35 minutes at 120° C. and cured after two hours at this temperature to a hard, infusible, insoluble state.

The cured resinous casting, as in the preceding example, withstood cooling to −64° C. without cracking but developed fine cracks when placed in a Dry Ice-acetone bath. No perceptible difference existed between the cured casting of the mixture of this example and that of the preceding example.

The viscosity of the uncured composition of Example I measured at 25° C. was 2,440 centipoises as determined using a Brookfield viscometer whereas that of the composition of Example II was 330 centipoises. The substantially lower viscosity of the composition of Example II would indicate a preference for that composition except that unreacted maleic anhydride is an irritant, and a composition including it would not be readily marketable for that reason. On the other hand, the acid-terminated diester of polyethylene glycol 400 and maleic anhydride is nonirritating. The viscosity of either mixture is considered satisfactorily low for the purposes of this invention and in each case remained at a suitably low level for a substantial time. For example, the viscosity of the uncured composition of Example II which was initially 330 centipoises rose to 1,280 centipoises after 24 hours at room temperature and to 7,300 centipoises after 120 hours. When the composition is refrigerated at about 5° C., it remains stably below a viscosity of 5,000 centipoises (measured at 25° C.) for two or three months.

A casting prepared using the thermosetting composition of this example and cured for two hours at 120° C. was held in an air-circulating oven for 7 days at a temperature of 120° C. It was found to have incurred a weight loss of 1.4 percent but otherwise appeared unaffected.

EXAMPLE III

Two moles of maleic anhydride and one mole of polypropylene glycol having an average molecular weight of 1,025 were reacted in a kettle with stirring for 5 hours at 150° C. The reaction was not noticeably exothermic and proceeded a good deal more slowly than do reactions between maeleic anhydride and polyethylene glycols under the same conditions. The reaction product was an acid-terminated diester having an average of about 16 ether linkages per molecule and a viscosity of 1,480 centipoises at 23° C. After 10 months' storage at room temperature, its viscosity was 2,580 centipoises. (Note, for comparison, that the acid-terminated diester of maleic anhydride and polypropylene glycol 2050 has a viscosity of 4,200 centipoises after about ten months' storage.)

A number of compositions were prepared by mixing the freshly-prepared acid-terminated diester of polypropylene glycol 1025 with the normally liquid, low molecular weight epoxy resin described in Example I and adding thereto the tetrapropenyl succinic anhydride-dimethylbenzyl amine (TPSA-DMBA) mixture used in that example. The first four compositions included an excess of carboxyl groups, and the last, composition No. 5 of Table A, included an excess of epoxy groups. To evaluate the flexibility and elasticity of the cured products of these compositions, each was cast around a hexagonal steel nut in the manner described in Example I, cured for two hours at 120° C. and allowed to cool until cracks appeared in the resinous casting. The approximate temperatures at which cracks were first detected in each casting are noted in Table A along with the initial viscosity of each composition measured at room temperature with the Brookfield viscometer and the propylene ether content of the composition and of the cured product.

TABLE A

| Composition Number | 1 | 2 | 3 | 4 | 5 |
|---|---|---|---|---|---|
| Ingredients: | | | | | |
| Epoxy resin | 40 | 40 | 40 | 40 | 40 |
| TPSA-DMBA | 27 | 40 | 45.5 | 48 | 27 |
| Acid-terminated diester | 122 | 61 | 36.5 | 30 | 30 |
| Initial viscosity in centipoises | 600 | 880 | | 1,200 | 1,170 |
| Cured casting at room temperature | (1) | (2) | (3) | (3) | (3) |
| Casting cracked at ° C | −57 | −50 | −62 | −47 | −51 |
| Propylene ether content by weight, percent | 50 | 34 | 23 | 20 | 24 |

1 Soft, tacky.
2 Firm, pliant.
3 Hard.

That the acid-terminated diester of the polypropylene glycol and maleic anhydride acts as a viscosity depressant is shown by the lower viscosities obtained with the use of larger proportions of the acid-terminated diester.

The elongation at break of a casting made with composition #4 was 70% as determined by ASTM test procedure D638-49T. The hardness measured on the Shore D scale was about 57.

EXAMPLE IV

To 40 parts of the acid-terminated diester of polypropylene glycol 1025 and maleic anhydride of the preceding example were added, at room temperature with stirring, 59 parts by weight of tetrapropenyl succinic anhydride, 0.8 part of tris(2,4,6-dimethylaminomethyl)phenol as catalyst, and 0.2 part of a nonsettling carbon black as pigment. About 67.7 parts powdered talc were mixed in to yield a 40 percent filled composition, referred to in this example as the hardener composition.

The bisphenol-type epoxy resin described in Example I was mixed with powdered talc to obtain a 40 percent filled resin composition.

Two parts of the hardener composition were mixed with one part of the resin composition at room temperature, at which temperature the mixture was a viscous fluid. Portions of the mixture were warmed to various temperatures and immediately checked for viscosity, with the following results at:

Degrees centigrade: Cps.
40 _____ 5800
60 _____ 1800
80 _____ 580
100 _____ 180

Thus in spite of the high percentage of filler, the composition can, upon warming, penetrate fine interstices of electrical coils and the like. That it remains thinly liquid for sufficiently long periods of time is demonstrated by the fact that the composition gels in 20–25 minutes at 120° C. in an air-circulating oven, as measured with a Sunshine gel timer.

A sample of the mixture was used to encapsulate a steel hex nut as described in Example I. The resin was cured for two hours at 120° C. and gradually cooled to more than −40° C. without cracking. The test was repeated a number of times, and in each case the cured sample withstood a temperature drop to below −40° C.

Another sample of the mixture of two parts of the hardener composition with one part of resin composition was used to encapsulate a large current-transformer measuring approximately 8 to 10 by 4 inches in size and was cured at 120° C. for two hours. This resinous casting was cooled to −40° C. without cracking. After the temperature of the casting had returned to normal room temperature, the casting was dropped from a height of five feet to a concrete floor. The casting absorbed this shock without evidence of injury either to itself or to the transformer.

In spite of the relatively high proportion of filler in the resinous composition and the complexity of the transformer, the cured casting appeared to be free of voids and presented a satisfactory outward appearance.

Three samples of the same thermosetting mixture were used to encapsulate mercury relays. The resin was cured for two hours at 120° C. The encased relays were held over an aqueous solution of a saturated alkyl-aryl-sulfonate detergent solution at 82° C. for 350 hours, after which the insulation resistance was tested. The three samples averaged 182 megohms, an exceptionally high value.

It was found that mixtures of one part of the resin composition and two parts of the hardener composition could be retained at room temperatures for at least about four days and still be used to produce castings of equal caliber to those obtained from fresh mixtures. Even though a mixture has advanced somewhat in viscosity after four days, it poured easily on heating.

EXAMPLE V

The chemical incorporation of shorter-chain polyglycols, i.e., polyglycols having less than an average of about six or eight ether linkages per molecule, into the cured products of epoxy resin also imparts a flexibility and elasticity thereto. However, the short-chain polyglycols and acid-terminated polyesters prepared therefrom do not act as viscosity depressants in the uncured compositions as do those of longer chains, as evidenced by certain experiments using polyethylene glycol of an average molecular weight of 200, which has about 3 ethylene ether groups.

About 98 parts of maleic anhydride and 100 parts by weight of polyethylene glycol 200 were heated together for five hours at 150° C., yielding an acid-terminated diester. Twenty grams of the diester were mixed at room temperature with 40 grams of the epoxy resin described in Example I. Heat was applied to the diester-epoxy resin mixture, and a blend of about 26.8 grams of tetrapropenyl succinic anhydride and 0.2 gram of dimethylbenzyl amine was added with stirring, so that the ingredients of the composition were present in approximately stoichiometrically equivalent amounts. The mixture was poured over a steel hex nut as described in Example I and cured for four hours at 120 C. When cooled to −41° C., the casting cracked.

The cured casting of this example had a Shore D hardness of 80, which indicates somewhat greater rigidity than is preferred and an elongation in the order of 40%.

Acid-terminated diesters having less than about three alkylene ether units per average molecular weight are characterized by undesirably high viscosity, and thermosetting compositions prepared therewith are significantly higher in viscosity than are those employing diesters having longer alkylene ether chains. Viscosities of certain acid-terminated diesters are compared in Table B, along with viscosities of thermosetting compositions including 2 equivalents of the epoxy resin of Example I, 1 mole of tetrapropenyl succinic anhydride, 0.5 mole of the diester and a catalytic amount of dimethylbenzyl amine.

TABLE B

| Acid-terminated diester of maleic anhydride and— | Viscosity in cps. of— | | Failure in nut test at ° C. |
|---|---|---|---|
| | Diester alone | Curable composition | |
| Polyethylene glycol 400 | 3,150 | 2,440 | [1] −64 |
| Polyethylene glycol 200 | 15,800 | 4,000 | −41 |
| Diethylene glycol | 72,000 | 6,970 | −26 |
| Ethylene glycol | [2] | 9,250 | −23 |
| Dipropylene glycol | [2] | 22,400 | −45 |

[1] Below.
[2] Waxy solid.

Too much weight should not be placed on the nut test results recorded in Table B, since the test results are not reproducible, except as a general indication as to the ability of a particular resin composition to be used for the encapsulation of electrical components.

EXAMPLE VI

One mole of polyethylene glycol having an average molecular weight of 600 was mixed with two moles, 268 grams, of diglycolic acid, and toluene was added as a water entrainer. The mixture was heated in a distillation apparatus until water was no longer distilled over, after which the toluene was stripped off leaving the acid-terminated diester of diglycolic acid and polyethylene glycol, which had a viscosity of 5000 centipoises at 25° C. One hundred thirty-five parts of this diester was mixed with 200 parts of an epoxy resin prepared from epichlorhydrin and bisphenol at a mole ratio of approximately 2:1 and having a melting point of about 43° C. as determined by the Durrans' Mercury Method and an epoxide equivalent weight of about 335. The mixture was heated while adding 228 parts by weight of a blend of 99.25% tetrapropenyl succinic anhydride and 0.75% dimethyl-benzyl amine. In spite of the fact that a higher weight epoxy resin was used than those used in the experiments reported in the preceding examples, the viscosity of the heat-curable composition at 25° C. was only 3,000 centipoises as measured with a Brookfield viscometer.

A sample used to encapsulate an ordinary steel hexagonal nut as described in Example I was cured for two hours at 120° C. to a tough, rigid solid. It was cooled to below −70° C. without any evidence of cracking.

EXAMPLE VII

A mixture of 40 parts of the acid-terminated diester of polybutylene glycol 1000 and maleic anhydride, 50 parts of the epoxy resin of Example I, 60 parts of tertapropenyl succinic anhydride, and 0.45 part of tris(2,4,6-dimethylaminomethyl) phenol was cured for three hours at 120° C. to provide a strong, tough casting having over 40% elongation. The composition and cured product comprised about 20% butylene ether groups by weight.

A cured specimen gained 0.35% in weight after 10 days immersion in water at room temperature. Another cured specimen experienced 0.64% loss in weight after 10 days at 120° C. in an air circulating oven. For a flexible resin, these values are very good. The water resistance is about 25% better than the cured product of an identical composition, save for substitution of polypropylene glycol 1025 in making up the acid-terminated diester. The two are about equal in resistance to heat aging. In both respects the two compositions far out perform compositions based on polyethylene glycol.

EXAMPLE VIII

An acid-terminated diester was prepared from one mole of polypropylene glycol of 425 average molecular weight and 1200 grams (4 carboxyl equivalents) of polymeric acid marketed by Emery Industries, Inc., under the designation "Dimer Acid." This acid is prepared by polymerizing $C_{18}$ unsaturated fatty acids and has the following characteristics:

Acid value (mg. KOH/gm.)—180
Saponification value (mg. KOH/gm.)—185
Unsaponifiables—Less than 2.0%
Neutralization equivalent—300
Dimer content, $C_{36}$—72%
Trimer content, $C_{54}$—22%
Monomer content—3%
Specific gravity at 15.5° C./15.5° C—0.95
Viscosity at 25° C.—About 10,000 cps.

The acid-terminated diester had a carboxyl equivalent weight of 741 and a viscosity of 9,000 centipoises at 25° C.

A mixture of 40 grams of this diester, 50 grams of the epoxy resin of Example I, 60 grams of tetrapropenyl succinic anhydride and 0.65 grams of tris(2,4,6-dimethyl-aminomethyl) phenol had an initial viscosity of 3150 centipoises at 25° C. and was cured for two hours at 120° C. Its hardness on the Shore D scale was 54. The polypropylene ether content of the composition was about 6%.

A cured specimen aged 11 days at 120° C. experienced only 0.33% weight loss and increased in Shore D hardness to 76, indicating its elongation was probably still over 40%. Immersion of another cured specimen in water at room temperature for 10 days resulted in 0.25% gain in weight. Immersion in boiling water for 8 days produced only 3.1% gain in weight, excellent for a flexible resin.

EXAMPLE IX

An acid-terinated polyester was prepared from three moles of succinic acid and two moles of polypropylene glycol 425. The polyester had a carboxyl equivalent weight of 746 and a viscosity of 8600 centipoises at 25° C.

A composition of 40 parts by weight of this polyester, 50 parts of the epoxy resin of Example I, 60 parts of tetrapropenyl succinic anhydride, and tertiary amine in catalytic proportion cured in two hours at 120° C. to a hard, but somewhat flexible casting. The propylene ether content of the cured product was about 16%.

EXAMPLE X

Acid-terminated polyesters were prepared at acid/hydroxyl ratios of 1.15/1 as follows: polyethylene glycol 200 plus succinic anhydride (PEG 200–SA), polypropylene glycol 425 plus succinic anhydride (PPG 425–SA), and polypropylene glycol 2025 plus maleic anhydride (PPG 2025–MA). The acid number and viscosity of the polyester is in each case noted in Table C. To 40 grams of each polyester was added 60 grams of tetrapropenyl succinic anhydride (TPSA), with the viscosity measured as noted in Table C. To each mixture was added 50 grams of the epoxy resin of Example I and 0.8 gram of tris(2,4,6-dimethylaminomethyl)phenol, and the viscosity was again measured and recorded in Table C. Each composition had a good pot life, remaining below about 20,000 cps. at 25° C. for at least about 4 days, but cured at 120° C. in three hours to provide the recorded Shore D hardness values which indicate good flexibility. Also shown is the alkylene ether content of each cured composition.

was 25. The propylene ether portion of the composition was 25%.

EXAMPLE XIII

A mixture of 50 parts by weight of the epoxy-terminated polyether of Example XII, 50 parts of the epoxy resin of Example I, and 2 parts of BF₃–400 (a complex of monoethyl amine and boron trifluoride) cured in an aluminum dish in 3.5 hours at 150° C. to a tough, stiff, but somewhat resilient casting two inches in diameter and ⅜-inch in height. The propylene ether content was 26%.

Other liquid and low-melting (Durran's softening point below about 50° C.) epoxy resins have utility in their invention such as "Epon 812," formerly called "Epon 562." This liquid, aliphatic epoxy resin has an epoxide equivalent of 140–165 and is believed to be made by reacting 3 moles of epichlorhydrin with one mole of glycerol in an ether solution with boron trifluoride as a catalyst, dissolving this product and a quantity of sodium aluminate in dioxane, agitating the solution at an advanced temperature, filtering out inorganic material, and heating to remove low boiling point components.

Also useful are epoxycyclohexane-type resins such as

TABLE C

| Polyester | Acid No. | Viscosity in cps. at 25° C. | | | Shore D Hardness | Alkylene ether content, percent |
| --- | --- | --- | --- | --- | --- | --- |
| | | Polyester Alone | With TPSA | With Epoxy | | |
| PEG 200–SA | 26.6 | 19,500 | 1,150 | 4,100 | 72 | 12 |
| PPG 425–SA | 30.6 | 13,200 | 2,900 | 7,250 | 63 | 7 |
| PPG 2025–MA | 7.0 | 1,900 | 1,370 | 3,500 | 60 | 4 |

EXAMPLE XI

An acid-terminated polypropylene ether which was free from ester groups was obtained from Union Carbide Chemical Co. designated as di-(2-carboxyethoxy)polypropylene glycol 1025. It is understood to have been prepared by reacting each of the hydroxyl groups of polypropylene glycol 1025 with acrylonitrile and then hydrolyzing the terminal nitrile groups to provide terminal carboxyl groups attached directly to the propylene ether chain.

A mixture of 26 grams of this acid-terminated polyether, 40 grams of a tetrapropenyl succinic anhydride, 34 grams of epoxy resin of Example I and a catalytic proportion of tris(2,4,6-dimethylaminomethyl) phenol, having an initial viscosity of 1640 cps. at 25° C. was cast around a steel hex nut as in Example I. After curing for two hours at 120° C. to a strong, tough casting, it withstood cooling to −40° C. before cracking. The alkylene ether content (including one ethylene ether in the acid-terminated polyether) was 23%.

EXAMPLE XII

A mixture of 341 grams of polypropylene glycol 1025 and 266 grams of the epoxy resin of Example I was refluxed under a nitrogen atmosphere with continual stirring for 20 hours at about 250° C. The reaction product, an epoxy-terminated polyether, had a room temperature viscosity of about 6500 cps. and an oxirane oxygen contents of 1.8%.

A mixture of 75 grams of this polyether, 25 grams of the epoxy resin of Example I, 56 grams of tetrapropenyl succinic anhydride, and 0.5 gram of tris(2,4,6-dimethylaminomethyl) phenol had an initial viscosity of 3000 cps. at 25° C. and cured in an aluminum dish in two hours at 120° C. to a tough, fairly flexible casting (two-inch diameter by ⅜-inch height). Its Shore D hardness the liquid "EP–201," a prouct of Union Carbide Chemicals Co. having the formula

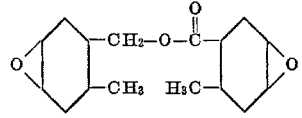

Epoxy resins produced by reacting a phenol-aldehyde Novolak and epichlorhydrin likewise have utility.

Many variations in the ingredients and preparation of the novel compositions of this invention will be obvious to those skilled in the art. Possible changes include the replacement of the terminal hydroxyl, acid, or epoxy groups of the polyalkylene ether chain with other groups reactive with epoxy resin. However, the polyalkylene glycols and particularly the acid-terminated polyesters thereof are much preferred for economy and ready availability, and may be used in conjunction with the alkenyl succinic anhydrides and similar low viscosity polycarboxylic acids to provide thermosetting compositions of unusually low viscosity. The use of such a combination of curing agents wherein the acid-terminated polyester or other polyalkylene ether having teminal reactive groups tends to provide tough, flexible cured products with epoxy resin while an anhydride-forming polycarboxylic acid tends to provide strong, hard products allows ready adjustment of properties of the cured products in accordance with specific requirements.

What is claimed is:
1. A low viscosity thermosetting epoxy resin composition for the production of strong cured articles having good resistance to thermal and mechanical shock and an elongation at break of at least 40%, said composition comprising a mixture of
   (1) epoxy resin selected from (a) polyglycidyl ether of polyhydric phenol or polyhydric alcohol and (b) epoxy cyclohexane resins,
   (2) carboxyl-terminated polyester having a viscosity not in excess of 20,000 cps. at 25° C. and having a skeletal chain consisting essentially of 1–15

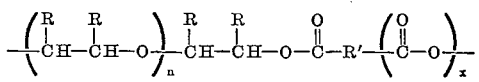

groups, wherein $n$ is an integer averaging at least 3, each R is selected from the group consisting of hydrogen and alkyl, any two Rs attached to adjoining carbon atoms together contain a total of not more than 4 carbon atoms, R' is a multivalent organic radical and $x$ is at least one, and (3) cyclic polycarboxylic anhydride in an amount providing at least 0.2 anhydride group per carboxyl group of said polyester, the proportion of ingredients (1), (2) and (3) being such that the

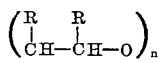

portion of said polyester comprises about 5–40% of their total weight and such that there is at least 0.2 epoxy group of epoxy resin per carboxyl group of said polyester and not more than about 1.3 epoxy groups for each anhydride group of said polycarboxylic anhydride and for each carboxyl group of said polyester, the viscosity of ingredients (1), (2) and (3) being selected such that the composition before addition of any diluent or filler does not exceed 20,000 cps. at 25° C.

2. A solution in a volatile organic solvent of the composition of claim 1.

3. The strong, shock-resistant, resinous cured product of the composition defined in claim 1.

4. A low viscosity thermosetting epoxy resin composition for the production of strong cured articles having good resistance to thermal and mechanical shock and an elongation at break of at least 40%, said composition comprising a mixture of (1) polyglycidyl ether of polyhydric phenol or polyhydric alcohol, (2) carboxyl-terminated polyester of about 2 moles of dicarboxylic acid and one mole of polyalkylene glycol of the formula

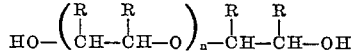

said polyester being essentially a diester, wherein $n$ is an integer averaging at least 3, each R is selected from hydrogen and alkyl, and any two R's attached to adjoining carbon atoms together contain a total of not more than 4 carbon atoms, the viscosity of which polyester does not exceed 20,000 cps. at 25° C., (3) cyclic polycarboxylic acid anhydride in an amount providing at least 0.2 anhydride group per hydroxyl group originally present in the polyalkylene glycol, the ingredients (1), (2) and (3) being so selected that the viscosity of the mixture does not exceed 20,000 cps. at 25 0 C., that the

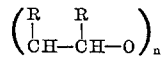

portion of the carboxyl-terminated polyester comprises about 5–40% of the total weight of the ingredients (1), (2) and (3), and that the polyglycidyl ether provides at least 0.2 epoxy group per hydroxyl group originally present in the polyalkylene glycol and not more than about 1.3 epoxy groups for each anhydride group of said polycarboxylic anhydride and for each carboxyl group of said polyester.

5. A low viscosity epoxy resin composition which, when admixed with an activator such as tertiary amine, forms a castable, thermosetting material for the production of strong cured semirigid articles having good resistance to thermal and mechanical shock and an elongation at break of at least 40%, said composition comprising a mixture of (1) polyglycidyl ether of polyhydric phenol or polyhydric alcohol, (2) cyclic polycarboxylic acid anhydride, and (3) the carboxyl-terminated polyester of about 2 moles of dicarboxylic acid and one mole of polyalkylene glycol of the formula

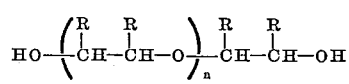

said polyester being essentially a diester, wherein $n$ is an integer averaging at least 6, each R is selected from hydrogen and alkyl, and any two R's attached to adjoining carbon atoms together contain a total of not more than 4 carbon atoms, the viscosity of which carboxyl-terminated polyester does not exceed 20,000 cps. at 25° C.; and the ingredients of the mixture being so selected that its viscosity does not exceed 20,000 cps. at 25° C., that the

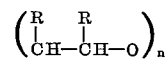

portion of the carboxyl-terminated polyester comprises about 5–20% of the total weight of the mixture, and that about 2 to 5 anhydride groups are present per unreacted carboxyl group of the carboxyl-terminated polyester and more than 1.0 and less than 1.4 epoxy groups are present per anhydride group.

6. A composition as defined in claim 5 wherein the polyalkylene glycol is polypropylene glycol.

7. A composition as defined in claim 5 wherein said polycarboxylic acid anhydride is an alkenyl succinic anhydride.

8. A composition as defined in claim 7 wherein the alkenyl succinic anhydride is tetrapropenyl succinic anhydride.

References Cited

UNITED STATES PATENTS

| 2,386,446 | 10/1945 | De Groate et al. | 260—485 |
| 2,512,722 | 6/1950 | Lanham | 260—485 |
| 2,324,483 | 7/1943 | Caston | 260—47 |
| 2,868,739 | 1/1959 | Nischk et al. | 260—75 |

PAUL LIEBERMAN, Primary Examiner

U.S. Cl. X.R.

260—37, 40, 47, 75, 78.4, 830